US010027637B2

(12) United States Patent
Coimbatore (10) Patent No.: US 10,027,637 B2
(45) Date of Patent: Jul. 17, 2018

(54) SECURE AND CONTROL DATA MIGRATING BETWEEN ENTERPRISE AND CLOUD SERVICES

(71) Applicant: Vormetric, Inc., San Jose, CA (US)

(72) Inventor: Saravanan Coimbatore, Cupertino, CA (US)

(73) Assignee: Vormetric, Inc., San Jose, CA (US)

( * ) Notice: Subject to any disclaimer, the term of this patent is extended or adjusted under 35 U.S.C. 154(b) by 0 days.

(21) Appl. No.: 14/656,518

(22) Filed: Mar. 12, 2015

(65) Prior Publication Data
US 2016/0269371 A1 Sep. 15, 2016

(51) Int. Cl.
*H04L 29/06* (2006.01)

(52) U.S. Cl.
CPC ...... *H04L 63/0471* (2013.01); *H04L 63/0281* (2013.01); *H04L 63/20* (2013.01); *G06Q 2220/10* (2013.01)

(58) Field of Classification Search
None
See application file for complete search history.

(56) References Cited

U.S. PATENT DOCUMENTS

| 8,898,481 | B1* | 11/2014 | Osburn, III | ......... H04L 63/0471 713/192 |
|---|---|---|---|---|
| 9,275,071 | B2 | 3/2016 | Orsini et al. | |
| 9,306,917 | B2 | 4/2016 | Brugger et al. | |
| 2009/0222656 | A1* | 9/2009 | Rouskov | ............... H04L 9/3213 713/155 |
| 2010/0042720 | A1* | 2/2010 | Stienhans | ............. G06F 9/5072 709/226 |
| 2010/0250925 | A1* | 9/2010 | Hiraide | ................. G06F 21/602 713/165 |
| 2011/0231899 | A1* | 9/2011 | Pulier | ................. G06F 9/45558 726/1 |

(Continued)

FOREIGN PATENT DOCUMENTS

WO WO 2012145825 11/2012

OTHER PUBLICATIONS

International Search Report and the Written Opinion of the International Searching Authority, PCT/US2016/020681, dated Jul. 13, 2016.

*Primary Examiner* — Maung T Lwin
(74) *Attorney, Agent, or Firm* — Womble Bond Dickinson (US) LLP (57) ABSTRACT

A method for operating a cloud gateway is provided. The method includes generating a plurality of rules relating users and groups to data access at a plurality of cloud service providers. The method includes encrypting, at one of a plurality of connectors, outgoing data that is moving through a cloud gateway en route from a proxy server to one of the plurality of cloud service providers, responsive to a data write request associated with a first user, the encrypting in accordance to one of the plurality of rules as related to the first user. The method includes decrypting, at one of the plurality of connectors, incoming data that is moving through the cloud gateway en route from one of the plurality of cloud service providers to the server, responsive to a data read request associated with a second user, the decrypting in accordance to one of the plurality of rules as related to the second user.

19 Claims, 10 Drawing Sheets

(56) References Cited

U.S. PATENT DOCUMENTS

| | | | |
|---|---|---|---|
| 2011/0264906 A1* | 10/2011 | Pourzandi | G06F 21/6218 713/153 |
| 2011/0276713 A1* | 11/2011 | Brand | H04L 67/1097 709/232 |
| 2012/0191969 A1* | 7/2012 | Clifford | G06F 11/1464 713/150 |
| 2012/0254957 A1* | 10/2012 | Fork | G06F 21/33 726/6 |
| 2013/0024919 A1* | 1/2013 | Wetter | G06F 21/335 726/6 |
| 2013/0042106 A1* | 2/2013 | Persaud | G06F 21/606 713/165 |
| 2013/0219169 A1* | 8/2013 | Del Signore | H04L 9/3263 713/153 |
| 2013/0305039 A1* | 11/2013 | Gauda | G06F 21/6218 713/153 |
| 2013/0311778 A1* | 11/2013 | Cherukuri | H04L 41/0803 713/171 |
| 2013/0332575 A1* | 12/2013 | Song | H04L 67/10 709/219 |
| 2014/0115325 A1* | 4/2014 | Detienne | H04L 63/0209 713/160 |
| 2014/0281531 A1* | 9/2014 | Phegade | H04L 9/083 713/168 |
| 2014/0281553 A1* | 9/2014 | Illion | H04L 51/28 713/173 |
| 2014/0317398 A1 | 10/2014 | Betz et al. | |
| 2014/0317683 A1 | 10/2014 | McBride et al. | |
| 2015/0006890 A1* | 1/2015 | Roth | G06F 21/6254 713/165 |
| 2015/0046971 A1* | 2/2015 | Huh | H04L 9/3213 726/1 |
| 2015/0106881 A1* | 4/2015 | Wharton | H04L 63/08 726/4 |
| 2015/0365382 A1* | 12/2015 | Balakrishnan | H04L 63/0428 713/168 |
| 2016/0065540 A1* | 3/2016 | Androulaki | H04L 9/14 713/171 |

* cited by examiner

SECURE AND CONTROL DATA MIGRATING BETWEEN ENTERPRISE AND CLOUD SERVICES

BACKGROUND

A proxy server acts as a proxy to the cloud, and controls access to the Internet from inside of an enterprise. A connector is a pass-through device, which can encrypt or decrypt data going from a server to a cloud service provider, or coming from a cloud service provider to a server. However, migrations of data to the cloud, and individual and group accesses through an enterprise to the cloud pose logistical issues for system administrators who must consider various security needs, policies and rules, and manually configure and reconfigure proxy servers and connectors in a changing environment.

It is within this context that the embodiments arise.

SUMMARY

In some embodiments, a method for operating a cloud gateway is provided. The method includes generating a plurality of rules relating users and groups to data access at a plurality of cloud service providers. The method includes encrypting, at one of a plurality of connectors, outgoing data that is moving through a cloud gateway en route from a proxy server to one of the plurality of cloud service providers, responsive to a data write request associated with a first user, the encrypting in accordance to one of the plurality of rules as related to the first user. The method includes decrypting, at one of the plurality of connectors, incoming data that is moving through the cloud gateway en route from one of the plurality of cloud service providers to the server, responsive to a data read request associated with a second user, the decrypting in accordance to one of the plurality of rules as related to the second user. The method operations and functionality may be embodied on a computer readable media in some embodiments.

In some embodiments, a mapping and access control system in a cloud gateway. The system includes a proxy server configured to access a plurality of cloud service providers and a plurality of connectors coupled to the proxy server and configured to couple to the plurality of cloud service providers via a network. The system includes an administration module configured to derive a plurality of access control rules based on users and network groups. The plurality of connectors is configured to encrypt data traveling from the proxy server to the plurality of cloud service providers and decrypt data traveling from the plurality of cloud service providers to the server, in accordance with the plurality of access control rules on a basis of individual users and individual network groups.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A cloud gateway, with a mapping and access control system, is discussed in more detail below. Users with accounts managed by an enterprise can migrate data associated with various applications to and from storage supported by cloud service providers, and can access (read and write) data at the cloud service providers, through the cloud gateway in various embodiments. A proxy server, and multiple connectors, one connector for each cloud service provider in some embodiments, couple to the cloud service providers via a network such as the Internet. The mapping and access control system maps users and groups to roles and permissions consistent with active directory (AD) policies or cloud service provider policies, and develops rules which control user and group access to data relative to the cloud service providers on a basis of individual users and individual groups. In various embodiments, access tokens are obtained from cloud service providers and applied in accordance with the rules. The connectors encrypt and decrypt data, applying keys in accordance with the rules. In some embodiments, self-contained files each include a key or a key name. In further embodiments, keys are stored in a database, associated with users, groups and/or various access control rules. In some embodiments, a group key is applied to encrypt data belonging to a group, and is applied selectively to decrypt data on an individual user basis to control which users can see clear data, according to the access rules.

Figure 1:
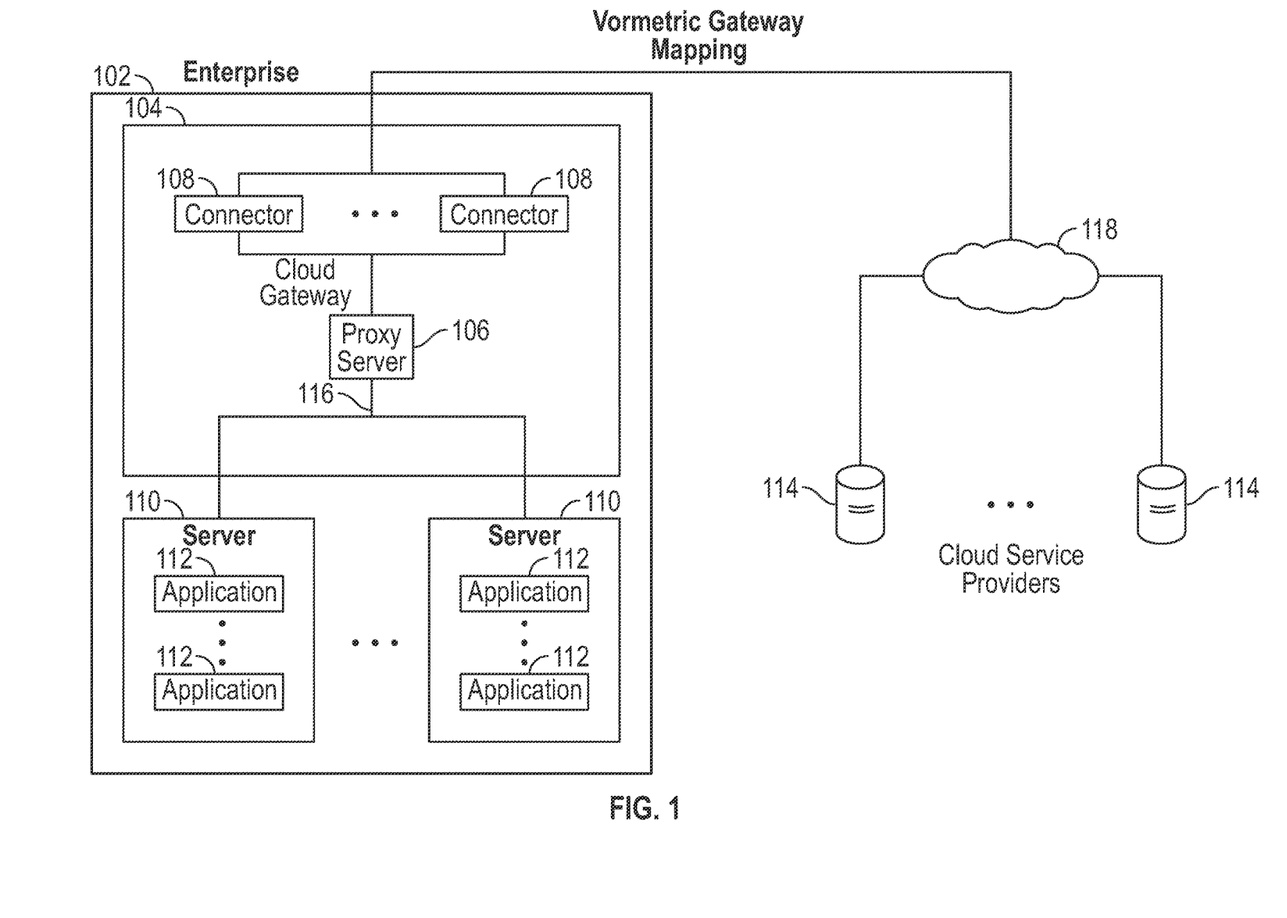
FIG. 1 is a system diagram of a mapping and access control system in a cloud gateway, in accordance with some embodiments.

FIG. 1 is a system diagram of a mapping and access control system in a cloud gateway 104 in an enterprise 102, in accordance with some embodiments. The cloud gateway 104 has a proxy server 106, a network 116 (e.g., an intranet), and multiple connectors 108, one for each of multiple cloud service providers 114 to which the cloud gateway 104 couples via a network 118 such as the Internet. Multiple servers 110, each hosting one or more applications 112, couple to the proxy server 106 via the network 116. Users and groups hosted by the enterprise 102 may be coupling to the various applications 112 and generating, storing, reading, manipulating or otherwise using data associated with the applications 112, as will be further discussed with reference to FIG. 5. When a user desires to migrate data associated with an application 112 or a server 110 to storage supported by one of the cloud service providers 114, data travels through the proxy server 106 and an appropriate one of the connectors 108 to the network 118 and to a selected one of the cloud service providers 114. In the reverse direction, when a user desires to move data from one of the cloud service providers 114 to one of the applications 112 or servers 110, data travels from the storage supported by the selected cloud service provider 114 through the network 118, through an appropriate one of the connectors 108 and through the proxy server 106 to the selected server 110 or application 112. Each connector 108 can encrypt data going to a cloud service provider 114 or decrypt data coming from a cloud service provider 114, using keys managed by the mapping and access control system, as will be further described with reference to FIGS. 2-4.

Figure 2:
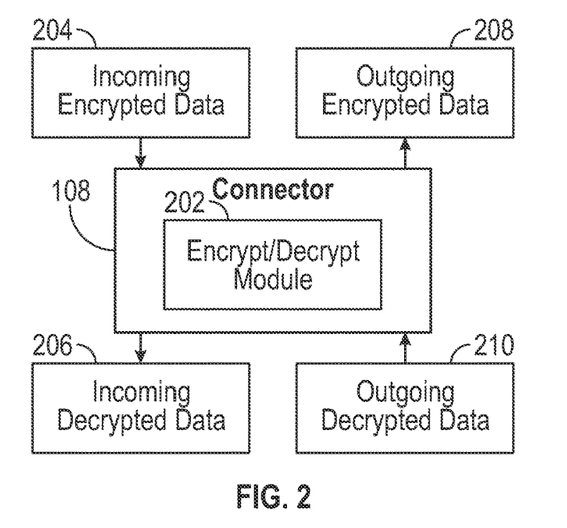
FIG. 2 depicts one of the connectors of FIG. 1, encrypting and decrypting data, in accordance with some embodiments.

FIG. 2 depicts one of the connectors 108 of FIG. 1, encrypting and decrypting data. Each connector 108 is associated with one of the cloud service providers 114, for example by having the system or an administrator set up various parameters of the connector 108. Connectors 108 can be implemented as software, firmware or hardware modules, for example in or coupled to a server, or in or coupled to a network. Incoming encrypted data 204, from one of the cloud service providers 114 to which the connector 108 is associated, is received by the connector 108. An encrypt/decrypt module 202 of the connector 108 decrypts the incoming encrypted data, which the connector 108 then sends out as incoming decrypted data 206, to be received by one of the servers 110 or applications 112 for use by one of the users or groups. Outgoing decrypted data 210 is received by the connector 108 from one of the servers 110 or applications 112. The encrypt/decrypt module 202 of the connector 108 encrypts the outgoing decrypted data 210, which the connector 108 then sends out as outgoing encrypted data 208, to be received by one of the cloud service providers 114 associated with the connector 108.

Figure 3:
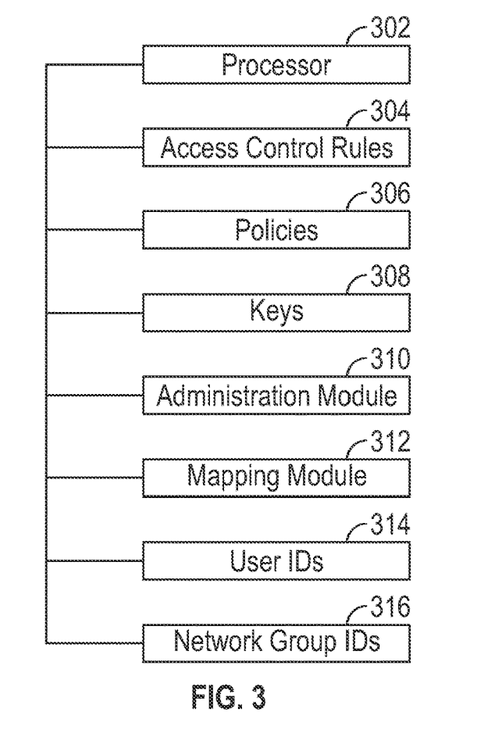
FIG. 3 is a block diagram of components of the mapping and access control system of FIG. 1, in accordance with some embodiments.

FIG. 3 is a block diagram of components of the mapping and access control system of FIG. 1. In various embodiments, these components can be implemented as modules, databases, or data structures, which are accessible and/or executable by a processor 302. Modules, in turn, can be implemented as software, firmware or hardware, or combinations thereof. In some embodiments, these components are implemented in the proxy server 106 of FIG. 1, or in one or more physical servers or virtual servers, appliances or other computing devices as readily devised in an enterprise 102 computing environment. A mapping module 312 maps user IDs 314 (i.e., identifiers of users, such as user account names) and network group IDs 316 (i.e., identifiers of network groups) to roles and permissions, in accordance with a policies module 306, which maintains policies for the system. An access control rules module 304 generates rules based on the mapping performed by the mapping module 312, consistent with the policies in the policies module 306.

Referring to FIGS. 1 and 3, these roles and permissions (which are used by the proxy server 106) are provided by the cloud service providers 114, for example in an agreement made between the enterprise 102 and the cloud service providers 114, or are derived from active directory policies. Active directory is a directory service that authenticates and authorizes users. In some embodiments, active directory uses Lightweight Directory Access Protocol (LDAP). The proxy server 106 (see FIG. 1) acts in a role defined by a cloud service provider 114 policy or an active directory policy, to access data at the cloud service providers 114 on behalf of one of the servers 110 or applications 112, or one of the users or groups. In some embodiments, the proxy server 106 obtains an access token from the cloud service provider 114 while acting in the above-defined role, and applies the access token for uploading or downloading. Meanwhile, the mapping and access system controls access and whether or not data is encrypted or decrypted, on a basis of individual users or individual groups. Thus, the role played by the proxy server 106 is specific to a cloud service provider 114 for a given data access, but may be reapplied for numerous users or groups. But, the mapping and access control system applies access control and encryption/decryption according to access control rules from the access control rules module 304, which are specific to individual users and individual network groups.

An administration module 310 of FIG. 3 coordinates keys held in or obtained by a keys module 308. In some embodiments the connector 108, handling a file (inbound or outbound), inquires of the administration module as to whether the file should be encrypted or decrypted and whether there is a key (i.e., requests a key). The administration module 310 consults the access control rules in the access control rules module 304, and determines whether encryption or decryption should be applied for a specified user or group associated with the file. The administration module 310 then answers the connector 108 appropriately and provides a key when appropriate. The keys module 308 stores, obtains or generates keys. For example, the keys could be stored in a database which associates encryption and decryption keys with user IDs and/or network group IDs in some embodiments. In further embodiments, self-contained files have keys installed by and obtained by the keys module 308, as will be described below with reference to FIG. 4.

Figure 4:
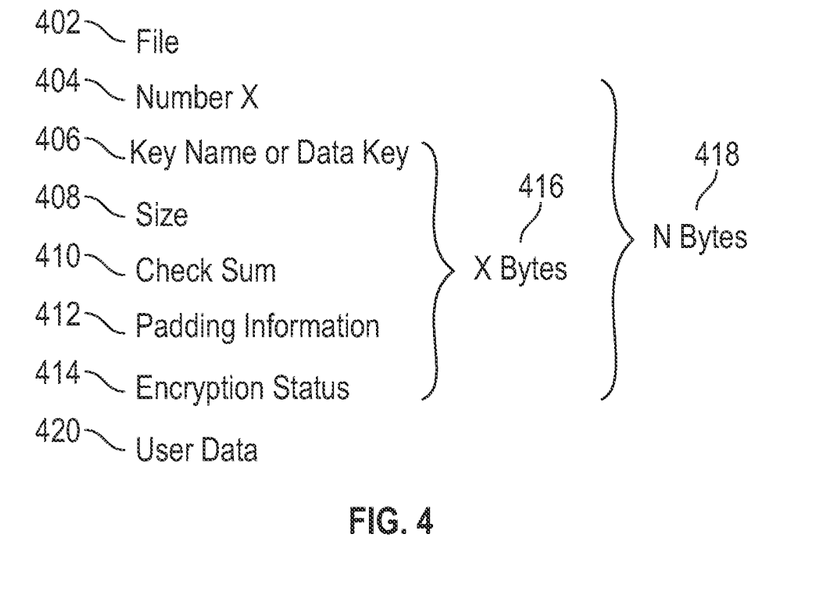
FIG. 4 depicts contents of a self-contained file, which includes a data key or a key name, and can be used in the system of FIG. 1, in accordance with some embodiments.

FIG. 4 depicts contents of a self-contained file 402, which includes a data key or a key name 406, and can be used in the system of FIG. 1. The self-contained file 402 also includes user data 420, which is handled as follows. When a self-contained file 402 is retrieved from a cloud service provider 114 (e.g., in response to a user request) the connector 108 extracts the first N bytes 418 from the self-contained file 402. These are decrypted by the connector 108 using a master key as provided by the administration module 310 from the keys module 308. The first entry in the N bytes 418 is the number X 404. In some embodiments, the number X 404 is the number of bytes required to store the encryption key or key name, the size and other relevant information, e.g., metadata. The relevant information includes a data key or key name 406, size 408, checksum 410, padding information 412, and encryption status 414. If the data key itself is included, this key is then used for decrypting the user data 420, which resides after the end of the N bytes 418 in the self-contained file 402. If instead, a key name is included, the administration module 310 can fetch the appropriate key from the keys module 308 according to the key name, and pass this back to the connector 108, for use to decrypt the user data 420. The size 408 parameter indicates the size of the user data 420. The checksum 410 is a checksum of the user data 420, which can be used to verify integrity of the user data 420. In some embodiments, the checksum 410 applies to encrypted user data, and in other embodiments, the checksum 410 applies to decrypted user data. Padding information 412 indicates how much padding is applied to the user data 420, in accordance with some encryption and decryption algorithms. Encryption status 414 indicates whether or not the user data 420 is encrypted in the self-contained file 402.

To create a self-contained file 402, the reverse of the above procedure may be followed in some embodiments. Thus, when outgoing data is to be sent to a cloud service provider 114, the keys module 308 provides a data key. The encrypt/decrypt module 202 of the connector applies padding to the user data 420 and encrypts the user data 420 using the data key, generating a checksum before or after the encryption as appropriate and noting the size 408 of the user data 420. The encrypt/decrypt module 202, or the processor 302, or another module of the system can then prepare the X bytes 416 with the data key or key name 406, the size 408, the checksum 410, the padding information 412, and the encryption status 414 as above. Once this is prepared, the number for the X bytes 416 is then known, and can be attached as the number X 404 to make up the N bytes 418. The encrypt/decrypt module 202 of the connector 108 encrypts the N bytes 418, using a master key provided by the keys module 308, and assembles the encrypted N bytes 418 with the encrypted user data 420 to make up the self-contained file 402. In variations, the self-contained file 402 includes further or other types of file information and/or metadata, in encrypted or unencrypted form in various combinations and arrangements. In some embodiments, each self-contained file 402 is identified with a universal resource locator (URL) or other identifier. This allows the freedom of moving the self-contained file 402 to different locations at a cloud service provider 114, such as in a different directory, folder, etc. Because the self-contained file 402 includes its own key, it is portable.

Figure 5:
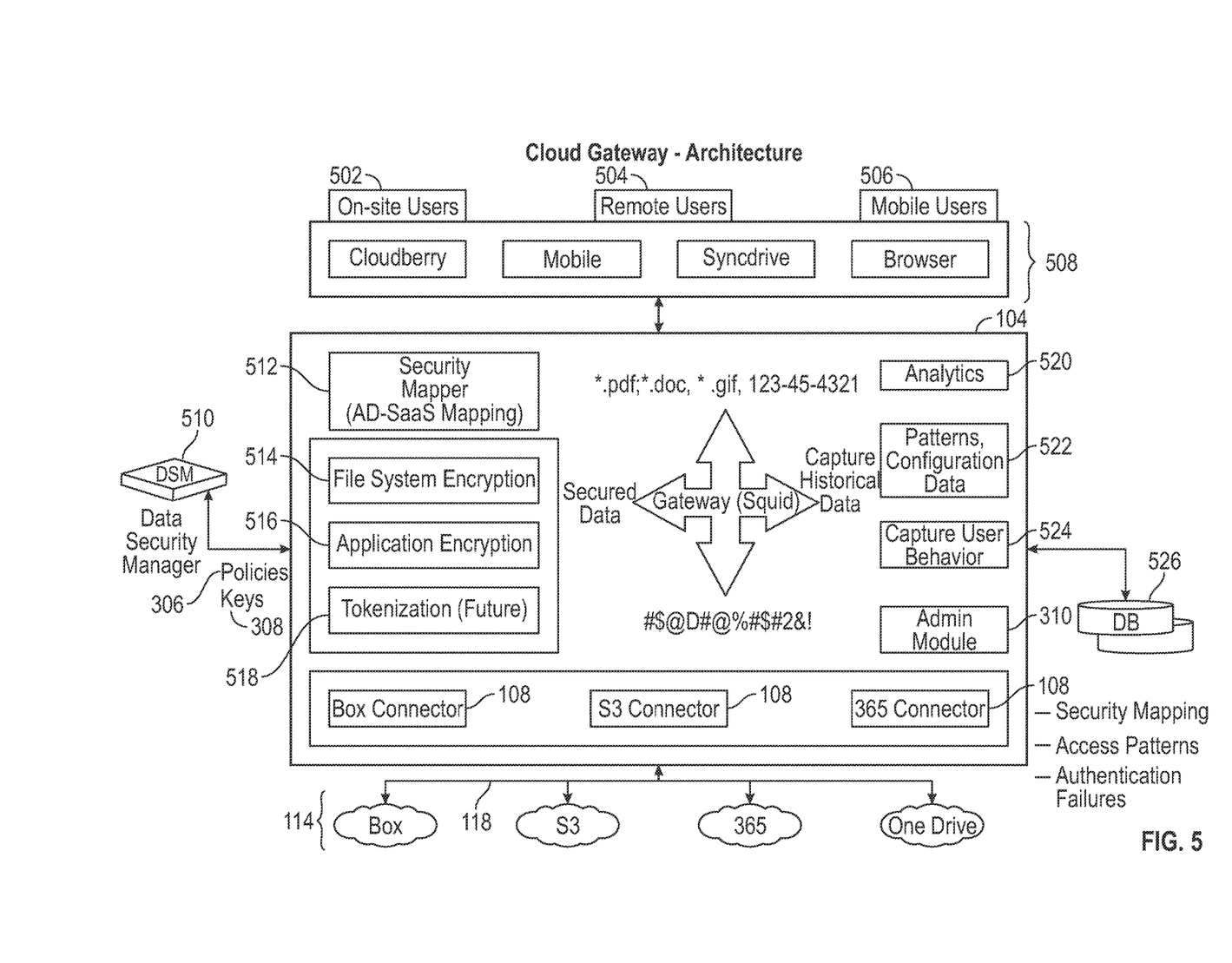
FIG. 5 is an architecture diagram for an embodiment of a cloud gateway, which uses the mapping and access control system of FIGS. 1-3, in accordance with some embodiments.

FIG. 5 is an architecture diagram for an embodiment of a cloud gateway 104, which uses the mapping and access control system of FIGS. 1-3. Various users, such as on-site users 502, remote users 504, and/or mobile users 506 are coupled to the cloud gateway 104 by various client applications 508 (e.g., CloudBerry™, Mobile™, SyncDrive™, and/or various browsers) which may operate on computing platforms or other systems local to the users or on distributed systems (e.g., applications 112 on servers 110 in the enterprise 102) accessible by the users, etc. The cloud gateway 104 is illustrated in this embodiment as having a Squid proxy server, but could have another proxy server 106. Data flows through the connectors 108 to and from the cloud service providers 114 (e.g., Box™, S3™, 365™, One Drive™, etc.) via the network 118 (here depicted as a line segment with branched arrows rather than the cloud shown in FIG. 1). As seen in FIG. 5, one of the connectors 108 (labeled "Box Connector") is associated with the cloud service provider 114 known as Box™, one of the connectors 108 (labeled "S3 Connector") is associated with the cloud service provider 114 known as S3™, one of the connectors 108 (labeled "365 Connector") is associated with the cloud service provider 114 known as 365™, while one of the cloud service providers 114 known as One Drive™ lacks an associated connector 108 (although one could be provided readily).

Still referring to FIG. 5, the administration module 310 performs security mapping, and analyzes access patterns and authentication failures, as part of capturing historical data. These duties can be performed by part of the administration module 310, or by separate modules, such as an analytics module 520, a patterns, configuration data module 522, and a capture user behavior module 524. Various maps and other associations can be stored in a database 526. A security mapper 512 maps active directory information regarding users and groups associated with the enterprise 102 to software as a service (SaaS) as provided by either the enterprise 102 or the cloud service providers 114. A data security manager 510 or other module, appliance, server or computing device manages policies, e.g. in a policies module 306, and keys, e.g. in a keys module 308. The cloud gateway 104 performs file system encryption 514 and application encryption 516, and may perform tokenization 518 (e.g., requesting, receiving and operating with tokens) as part of handling secured data.

Various embodiments of the cloud gateway 104 of FIGS. 1 and 5 function in the following manner, as will be further described with reference to FIGS. 6-12:

1) Intercept data migration from the enterprise 102 to the cloud and vice versa. Enterprises use storage and collaboration tools in the cloud. To better collaborate, data is moved from the enterprise 102 to the cloud (e.g., to cloud service providers 114) and vice versa. The cloud gateway 104 intercepts this migration using a proxy server 106 and using encryption and decryption (e.g., Internet Content Adaptive Protocol or ICAP and encryption/decryption as practiced at the connectors 108) to modify the data. The data is intercepted by connectors 108. One connector per cloud service provider 114 in the gateway intercepts the data migration and enforces the encryption/decryption/access control rules.

Figure 6:
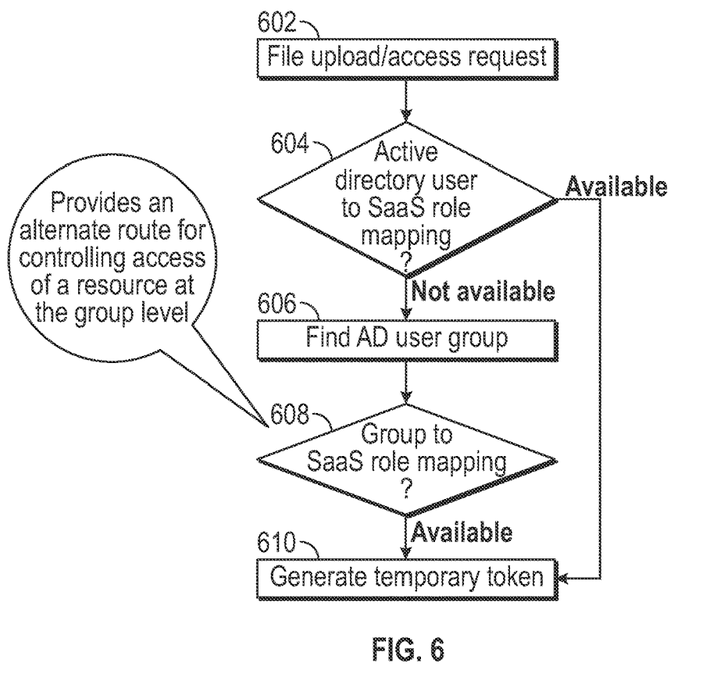
FIG. 6 is a flow diagram of mapping between active directory and cloud users, in accordance with some embodiments.

2) Define access control rules between enterprise user or group and a set of resources in the cloud. Enforce access control rules in the cloud gateway 104. Access control to a resource and mapping between the resource and the users who have access to the resource is specified via application programming interfaces (APIs). These mappings are defined in the cloud gateway 104 at a user or a group level. Mapping between active directory and cloud users is of the form of active directory user to cloud user or role, and active directory group to cloud user or role, as depicted in FIG. 6. User keys are discussed with reference to FIGS. 7 and 9, and group keys are discussed with reference to FIGS. 8 and 10.

3) Define encryption control rule for enterprise user or group and apply the encryption rule at the cloud gateway 104 when data is uploaded to the cloud (e.g., to cloud service providers 114). This is depicted in FIGS. 7 and 8.

Figure 9:
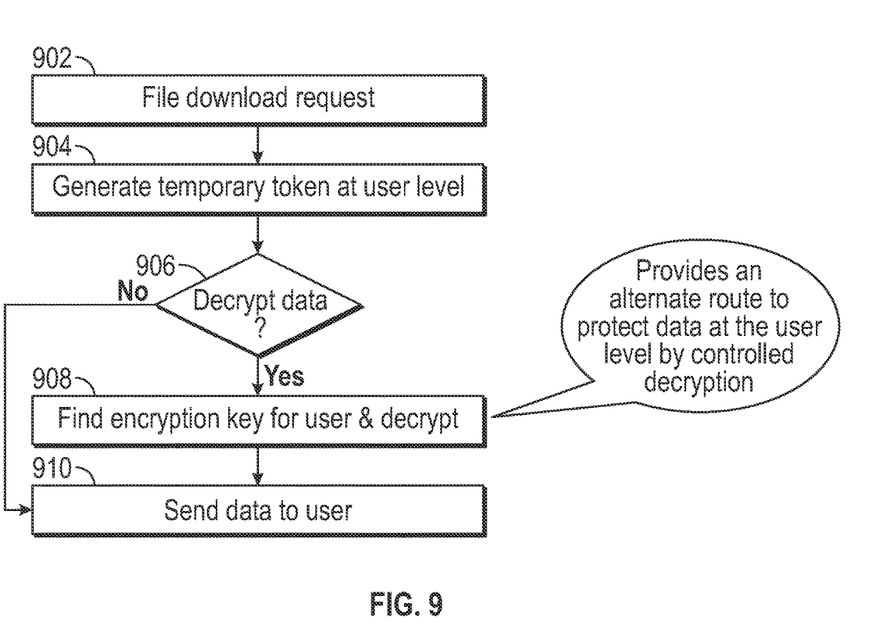
FIG. 9 is a flow diagram of a file download request at the user level, in accordance with some embodiments.
Figure 10:
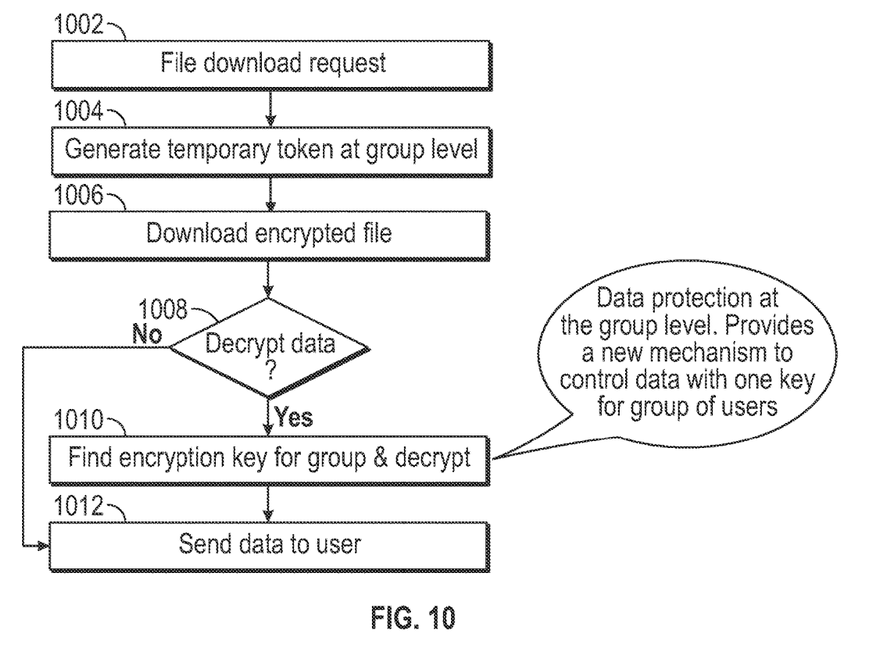
FIG. 10 is a flow diagram of a file download request at the group level, in accordance with some embodiments.
Figure 11:
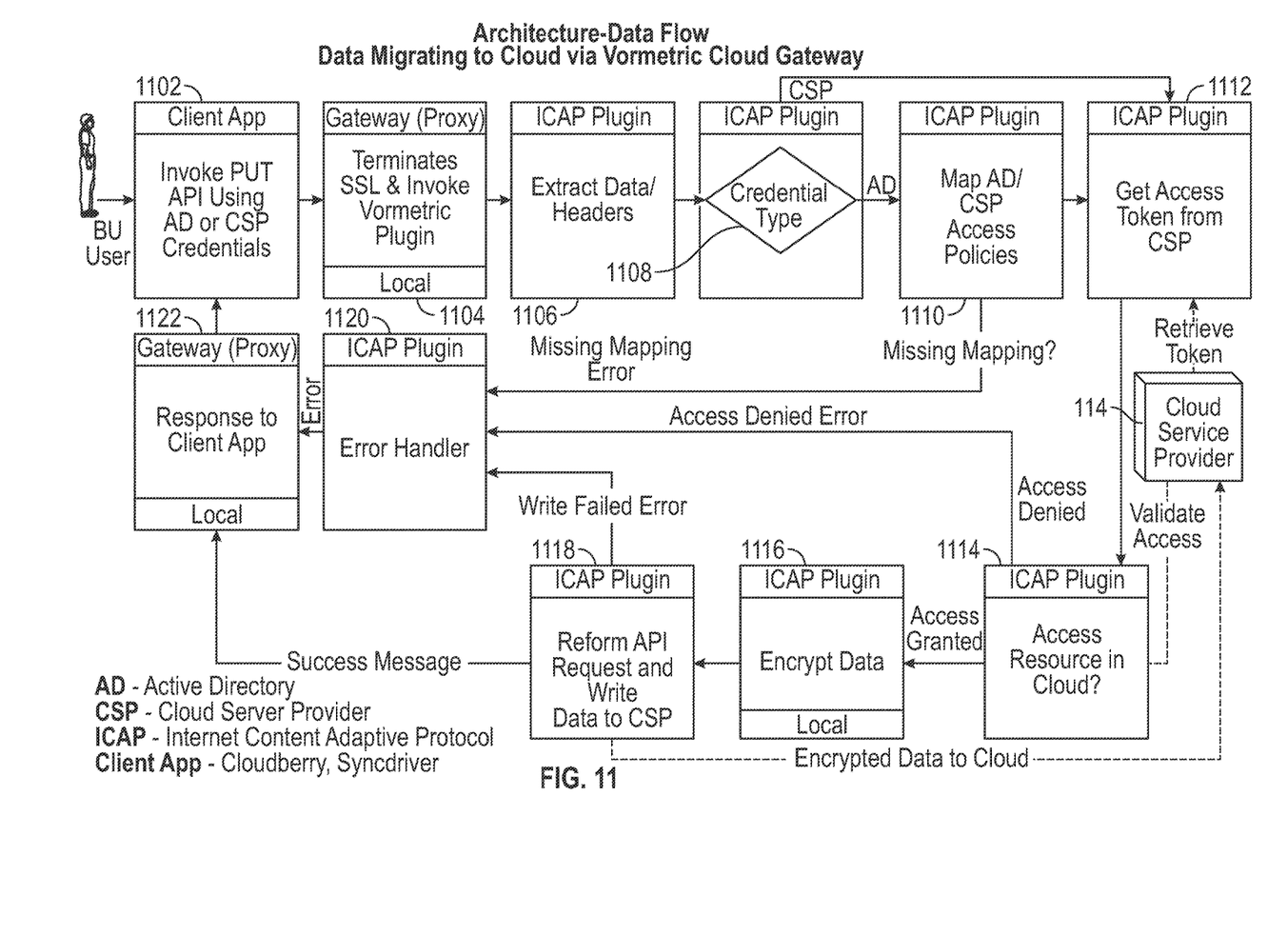
FIG. 11 is a flow diagram of data migrating to the cloud via the cloud gateway of FIG. 1 or FIG. 5 or variation thereof, in accordance with some embodiments.
Figure 12:
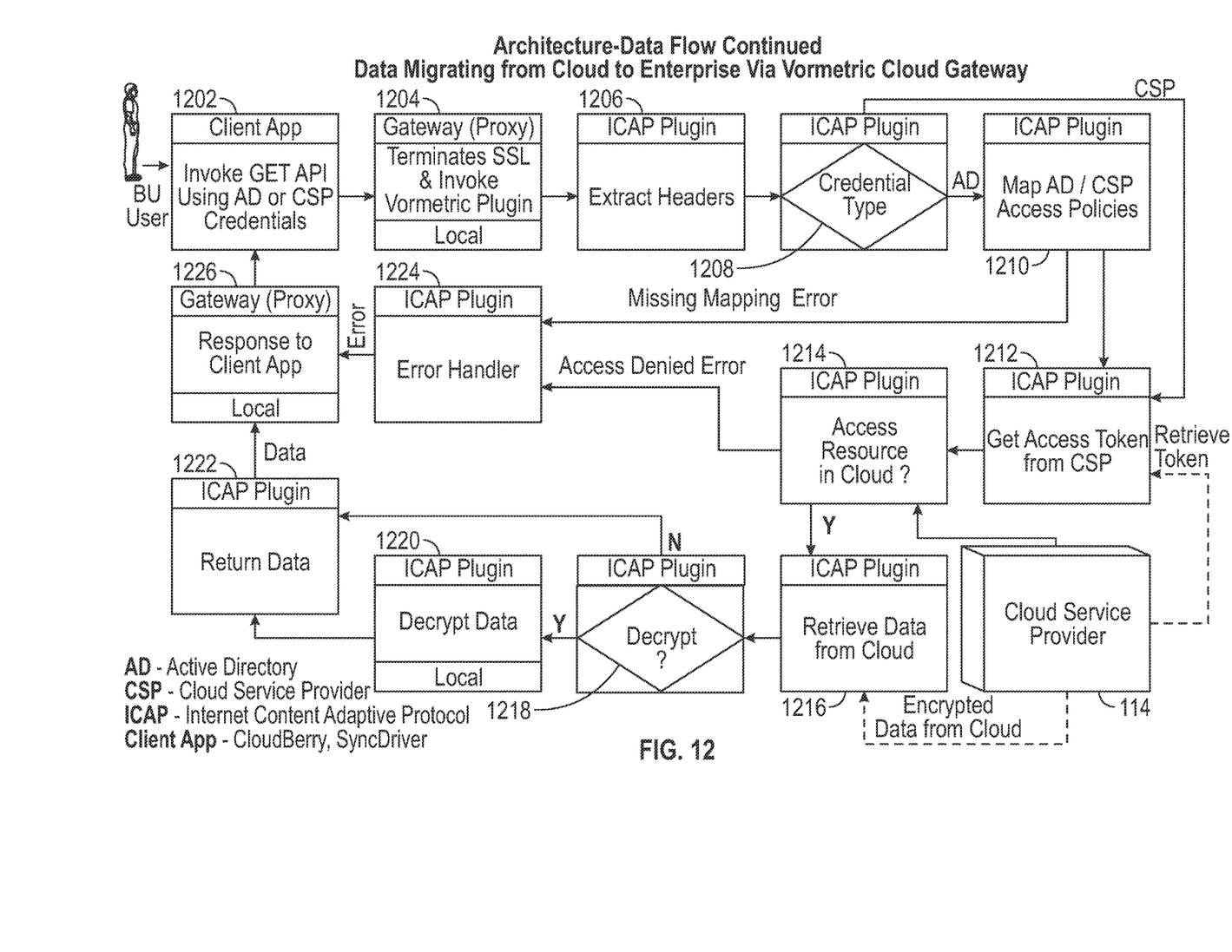
FIG. 12 is a flow diagram of data migrating from the cloud to an enterprise via the cloud gateway of FIG. 1 or FIG. 5 or variation thereof, in accordance with some embodiments.

4) Define decryption control rule for enterprise user or group and apply the decryption rule at the cloud gateway when data is downloaded from the cloud (e.g. cloud service providers 114). This is depicted in FIGS. 9 and 10. Specific processes for data migrating to the cloud via the cloud gateway 104, and data migrating from the cloud to the enterprise 102 via the cloud gateway 104, are depicted in FIGS. 11 and 12 respectively, which show embodiments having various (e.g., software) plug-ins which can be executed in the cloud gateway 104.

FIG. 6 is a flow diagram of mapping between active directory and cloud users. In an action 602, a file upload/access request is received, e.g., from a user who is a member of a group. In a decision action 604, it is determined whether active directory user to software as a service mapping is available. If the mapping is available, flow branches to the action 610, to generate a temporary token. If the mapping is not available, flow branches to the action 606, to find an active directory user group. If the decision action 608 finds that there is a group to software as a service role mapping, flow branches to the action 610, to generate a temporary token. It should be appreciated that this provides an alternate route for controlling access of a resource at the group level.

Figure 7:
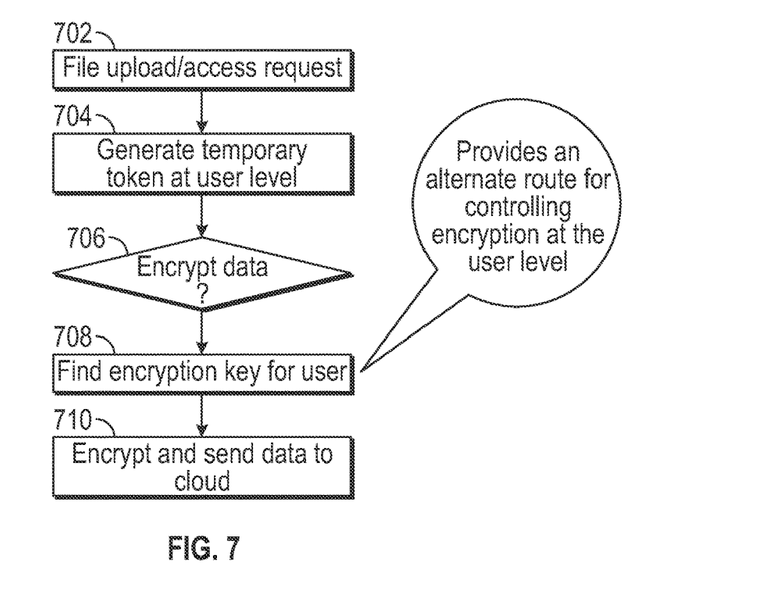
FIG. 7 is a flow diagram of a file upload request at the user level, in accordance with some embodiments.
Figure 8:
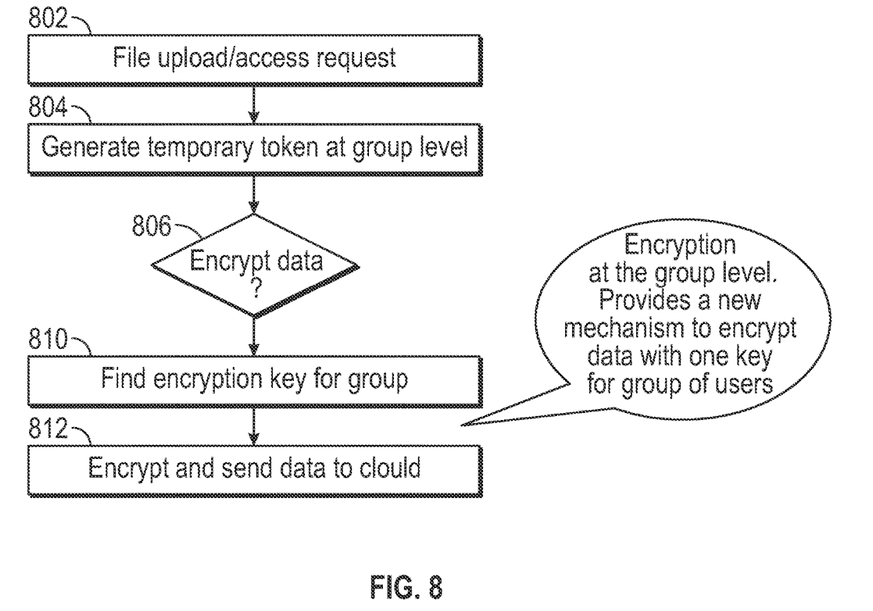
FIG. 8 is a flow diagram of a file upload request at the group level, in accordance with some embodiments.

FIG. 7 is a flow diagram of a file upload request at the user level. In an action 702, a file upload/access request is received, e.g., from a user. In an action 704, a temporary token is generated at the user level. In a decision action 706, it is determined whether to encrypt the data. If the answer is yes, flow branches to the action 708, to find an encryption key for the user. Flow proceeds to the action 710, to encrypt and send the data to the cloud. It should be appreciated that this provides an alternate route for controlling encryption at the user level.

FIG. 8 is a flow diagram of a file upload request at the group level. In an action 802, a file upload/access request is received, e.g., from a user belonging to a group. In an action 804, a temporary token is generated at the group level. In a decision action 806, it is determined whether to encrypt the data. If the answer is yes, flow proceeds to the action 810, to find an encryption key for the group. In an action 812, the data is encrypted and sent to the cloud. It should be appreciated that this is an example of encryption at the group level, which provides a mechanism to encrypt data with one key (i.e., a group key) for a group of users.

FIG. 9 is a flow diagram of a file download request at the user level. In an action 902, a file download request is received, e.g., from a user. In an action 904, a temporary token is generated at the user level. In a decision action 906, it is determined whether to decrypt the data. If the answer is no, the data should not be decrypted, flow proceeds to the action 910 to send the data to the user (without decryption). This may be because the rules specify that the user does not have access to decrypted data but does have access to encrypted data without decryption. Or, this may be because the rules specify that the user can only access unencrypted data, so that the data being downloaded is not encrypted and does not need decryption. If the answer to the decision action 906 is yes, the data should be decrypted, flow proceeds to the action 908, to find an encryption key for the user and decrypt the data. Flow proceeds to the action 910, to send the (now decrypted) data to the user.

FIG. 10 is a flow diagram of a file download request at the group level. In an action 1002, a file download request is received, e.g., from a user who is a group member. In an action 1004, a temporary token is generated at the group level. In an action 1006, an encrypted file is downloaded. In a decision action 1008, it is determined whether to decrypt the data. If the answer is no, the encrypted file should not be decrypted, flow branches to the action 1012 to send the data to the user. If the answer is yes, the encrypted file should be decrypted, flow branches from the decision action 1008 to the action 1010, to find an encryption key for the group (i.e., a group key) and decrypt the data. Flow then proceeds to the action 1012, to send the decrypted data to the user.

FIG. 11 is a flow diagram of data migrating to the cloud via the cloud gateway 104 of FIG. 1 or FIG. 5 or variation thereof. A user, operating a client application (app), invokes a PUT (e.g., a data write) using active directory or cloud service provider (CSP) credentials, in an action 1102. The cloud gateway 104, or more specifically the proxy server 106, terminates a secure sockets layer (SSL) operation and invokes a plug-in (e.g., a Vormetric™ plug-in available from the assignee of the present application), in an action 1104. In an action 1106, an Internet Content Adaptive Protocol plug-in extracts data and headers. In a decision action 1108, the Internet Content Adaptive Protocol plug-in determines a credential type. If the credential type is a cloud service provider type, flow proceeds to the action 1112, to get an access token from the cloud service provider 114. If the credential type is an active directory type, flow proceeds to the action 1110. In the action 1110, the Internet Content Adaptive Protocol plug-in maps the active directory and cloud service provider access policies, and flow proceeds to the action 1112 where the Internet Content Adaptive Protocol plug-in gets an access token from the cloud service provider.

If, in attempting the action 1110, there is a missing mapping, flow branches to the action 1120. In the action 1120, the Internet Content Adaptive Protocol plug-in invokes an error handler, which sends an error message through the action 1122, in which the cloud gateway 104 or more specifically the proxy server 106 sends a response to the client application. Once an access token is obtained from the cloud service provider 114, in the action 1112, flow proceeds to the action 1114. In the action 1114, the Internet Content Adaptive Protocol plug-in determines whether to access a resource in the cloud. This determination can be performed in cooperation with the administration module 310, in accordance with the access control rules, mapping and policies as discussed regarding FIG. 3, and is on an individual user basis or individual group membership basis. If the Internet Content Adaptive Protocol plug-in, in the action 1114, determines that access is denied, the Internet Content Adaptive Protocol plug-in sends an access denied error message through the error handler routine in the action 1120 to action 1122, for the response to the client application. If the Internet Content Adaptive Protocol plug-in, in the action 1114, determines that access is granted, flow proceeds to the action 1116. In the action 1116, the Internet Content Adaptive Protocol plug-in encrypts the data. This can be performed using the key provided by the administration module 310 and the keys module 308 of FIG. 3. In some embodiments, the key can be wrapped into a self-contained file 402 as described with reference to FIG. 4. In the action 1118, the Internet Content Adaptive Protocol plug-in reforms the application programming interface request and writes the data to the cloud service provider 114 (shown as the encrypted data to cloud along the dashed and dotted line). If this operation fails, the Internet Content Adaptive Protocol plug-in, in the action 1118, sends a write failed error message through the error handler of the action 1120 to the action 1122, for the response to the client application. If the operation is a success in the action 1118, the Internet Content Adaptive Protocol plug-in sends a success message to the action 1122, for the response to the client application. In the action 1122, the cloud gateway 104, or more specifically the proxy server 106, sends a response to the client application. This could be an error message or a success message, as discussed previously.

FIG. 12 is a flow diagram of data migrating from the cloud to an enterprise 102 via the cloud gateway 104 of FIG. 1 or FIG. 5 or variation thereof. A user, operating a client application, invokes a GET (e.g., a data read) using active directory or cloud service provider credentials, in an action 1202. The cloud gateway 104, or more specifically the proxy server 106, terminates a secure sockets layer operation and invokes a plug-in (e.g., a Vormetric™ plug-in available from the assignee of the present application), in an action 1204. In an action 1206, the Internet Content Adaptive Protocol plug-in extracts headers. In a decision action 1208, the Internet Content Adaptive Protocol plug-in determines a credential type. If the credential type is a cloud service provider type, flow proceeds to the action 1212, to get an access token from the cloud service provider 114. If the credential type is an active directory type, flow proceeds to the action 1210. In the action 1210, the Internet Content Adaptive Protocol plug-in maps the active directory and cloud service provider access policies, and flow proceeds to the action 1212 where the Internet Content Adaptive Protocol plug-in gets an access token from the cloud service provider.

If, in attempting the action 1210, there is a missing mapping, flow branches to the action 1224. In the action 1224, the Internet Content Adaptive Protocol plug-in invokes an error handler, which sends an error message through the action 1226, in which the cloud gateway 104 or more specifically the proxy server 106 sends a response to the client application. Once an access token is obtained from the cloud service provider 114, in the action 1212, flow proceeds to the action 1214. In the action 1214, the Internet Content Adaptive Protocol plug-in determines whether to access a resource in the cloud. This determination can be performed in cooperation with the administration module 310, in accordance with the access control rules, mapping and policies as discussed regarding FIG. 3, and is on an individual user basis or individual group membership basis. If the Internet Content Adaptive Protocol plug-in, in the action 1214, determines that access is denied, the Internet Content Adaptive Protocol plug-in sends an access denied error message through the error handler routine in the action 1224 to action 1226, for the response to the client application. If the Internet Content Adaptive Protocol plug-in, in the action 1214, determines that access is granted, flow proceeds to the action 1216. In the action 1216, the Internet Content Adaptive Protocol plug-in retrieves the data from the cloud. This is shown as a dotted and dashed line from the cloud service provider 114 with encrypted data from the cloud going to the action 1216. In the action 1218, the Internet Content Adaptive Protocol plug-in determines whether to decrypt the data. This determination can be performed in cooperation with the administration module 310, in accordance with the access control rules, mapping and policies as discussed regarding FIG. 3, and is on an individual user basis or individual group membership basis. If it is determined that the data should not be decrypted (or does not need to be decrypted) in the action 1218, flow proceeds to the action 1222, in order to return the data to the user. If it is determined that the data should be decrypted, flow proceeds from the action 1218 to the action 1220. In the action 1220, the Internet Content Adaptive Protocol plug-in decrypts the data. This can be performed using the key provided by the administration module 310 and the keys module 308 of FIG. 3, or a key unwrapped from a self-contained file 402 (which also contains the data to be decrypted) as described with reference to FIG. 4. In an action 1222, the Internet Content Adaptive Protocol plug-in returns the data to the user, through the action 1226. In the action 1226, the cloud gateway 104, or more specifically the proxy server 106, sends a response to the client application. This could be the returned data or an error message, as discussed previously.

Figure 13:
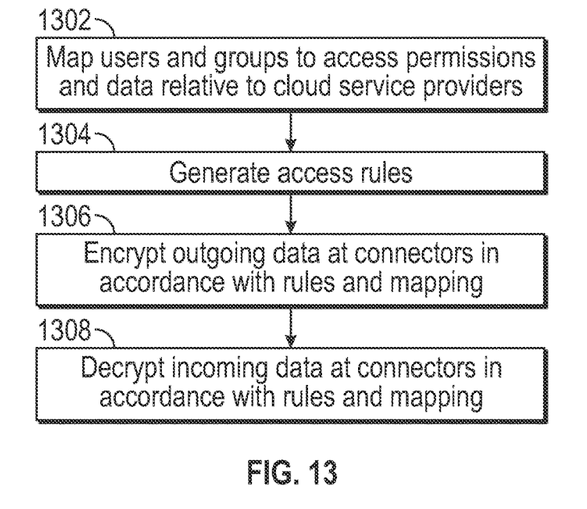
FIG. 13 is a flow diagram of a method for operating a cloud gateway, which can be practiced on or by the system of FIG. 1 or FIG. 5 or further embodiment thereof, in accordance with some embodiments.

FIG. 13 is a flow diagram of a method for operating a cloud gateway, which can be practiced on or by the system of FIG. 1 or FIG. 5 or further embodiment thereof. Especially, the method can be practiced by a processor, such as a processor in a cloud gateway 104 or a proxy server 106 or other server or computing device. In an action 1302, users and groups are mapped to access permissions and data relative to cloud service providers. For example, the mapping can be in accordance to access directory roles, rules or policies, or cloud service provider roles, rules or policies. In an action 1304, access rules are generated. The access rules are in accordance with the mapping performed in the action 1302. For example, the access rules could specify which users and which groups have access to which data at which cloud service providers, and which users and which groups are allowed to encrypt and decrypt data. In an action 1306, outgoing data is encrypted at connectors in accordance with the rules and the mapping. For example, a specific connector associated with a specific cloud service provider could encrypt data for some users and not for others, and for some groups and not for others, on an individual user and individual group basis as specified in the rules. In an action 1308, incoming data is decrypted at connectors in accordance with the rules and the mapping. For example, a specific connector associated with a specific cloud service provider could decrypt data for some users and not for others, and for some groups and not for others, on an individual user and individual group basis as specified in the rules.

Figure 14:
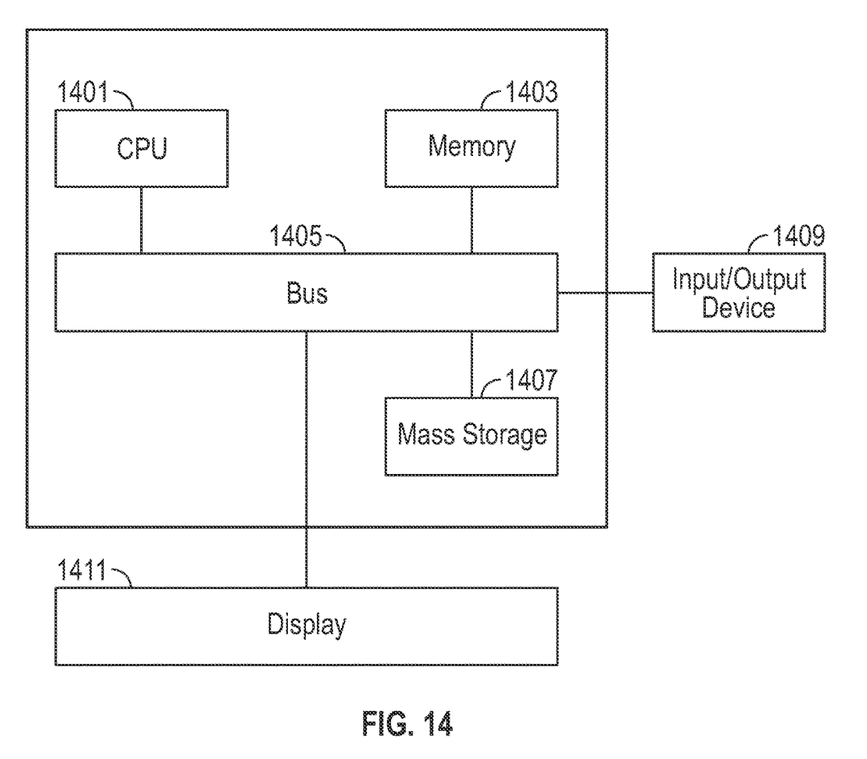
FIG. 14 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 14 is an illustration showing an exemplary computing device which may implement the embodiments described herein. The computing device of FIG. 14 may be used to perform embodiments of the functionality for mapping, access control and other cloud gateway functions in accordance with some embodiments. The computing device includes a central processing unit (CPU) 1401, which is coupled through a bus 1405 to a memory 1403, and mass storage device 1407. Mass storage device 1407 represents a persistent data storage device such as a floppy disc drive or a fixed disc drive, which may be local or remote in some embodiments. The mass storage device 1407 could implement a backup storage, in some embodiments. Memory 1403 may include read only memory, random access memory, etc. Applications resident on the computing device may be stored on or accessed via a computer readable medium such as memory 1403 or mass storage device 1407 in some embodiments. Applications may also be in the form of modulated electronic signals modulated accessed via a network modem or other network interface of the computing device. It should be appreciated that CPU 1401 may be embodied in a general-purpose processor, a special purpose processor, or a specially programmed logic device in some embodiments.

Display 1411 is in communication with CPU 1401, memory 1403, and mass storage device 1407, through bus 1405. Display 1411 is configured to display any visualization tools or reports associated with the system described herein. Input/output device 1409 is coupled to bus 1405 in order to communicate information in command selections to CPU 1401. It should be appreciated that data to and from external devices may be communicated through the input/output device 1409. CPU 1401 can be defined to execute the functionality described herein to enable the functionality described with reference to FIGS. 1-13. The code embodying this functionality may be stored within memory 1403 or mass storage device 1407 for execution by a processor such as CPU 1401 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for operating a cloud gateway, comprising:
generating a plurality of rules relating users and groups to data access at a plurality of cloud service providers;
encrypting, at one of a plurality of pass-through connectors, outgoing data that is moving through a cloud gateway en route from a proxy server to one of the plurality of cloud service providers, responsive to a data write request associated with a first user, the encrypting in accordance to one of the plurality of rules as related to the first user,
wherein the plurality of pass-through connectors includes a first pass-through connector that is coupled to the proxy server and associated to a first cloud service provider and has a first encryption/decryption module, and a second pass-through connector that is coupled to the proxy server and associated to a second cloud service provider and has a second encryption/decryption module, there being in the cloud gateway one pass-through connector per cloud service provider,
wherein the first encryption/decryption module and the second encryption/decryption module are implemented in hardware, firmware, software executing on a processor or combination thereof; and
decrypting, at one of the plurality of pass-through connectors, incoming data that is moving through the cloud gateway en route from one of the plurality of cloud service providers to the server, responsive to a data read request associated with a second user, the decrypting in accordance to one of the plurality of rules as related to the second user,
wherein the incoming data includes padding information and encryption status; and
wherein, the encrypting includes encrypting an outgoing file via application of a first key in accordance with the one of the plurality of rules, encrypting the first key or a key name of the first key and file information via application of a master key, and combining the encrypted file and the encrypted first key or key name and file information as the encrypted outgoing data.

2. The method of claim 1, wherein the decrypting and the plurality of rules control which user in a group sees clear data.

3. The method of claim 1, further comprising:
mapping the users and the groups to access roles relative to the plurality of cloud service providers, wherein the plurality of rules are generated in accordance with the mapping and wherein the mapping and the plurality of rules control user and group access to data relative to the plurality of cloud service providers on a basis of individual users and individual groups.

4. The method of claim 1, wherein:
the encrypting includes applying a group key to encrypt the outgoing data;
the decrypting includes applying the group key to decrypt the incoming data on an individual user or an individual group basis in accordance with the one of the plurality of rules.

5. The method of claim 1, further comprising:
obtaining an access token from one of the plurality of cloud service providers, in accordance with a role defined by the one of the plurality of cloud service providers or by an active directory policy; and
sending the encrypted outgoing data and the access token to the one of the plurality of cloud service providers, in order to store the encrypted outgoing data at the one of the plurality of cloud service providers on behalf of the first user.

6. The method of claim 1, further comprising:
obtaining an access token from one of the plurality of cloud service providers, in accordance with a role defined by the one of the plurality of cloud service providers or by an active directory policy; and
sending the access token and a request for data to the one of the plurality of cloud service providers, in order to obtain the incoming data on behalf of the second user.

7. The method of claim 1, wherein:
the decrypting includes decrypting a portion of the incoming data via application of the master key to obtain a second key or a key name of the second key and file information, and decrypting a further portion of the incoming data via application of the second key and the file information to obtain decrypted incoming data.

8. A tangible, non-transitory, computer-readable media having instructions thereupon which, when executed by a processor, cause the processor to perform a method comprising:
mapping users and network groups to access permissions relative to a plurality of cloud service providers;
encrypting a first data, at one of a plurality of pass-through connectors coupled to a proxy server, responsive to a request associated with one of the users or one of the network groups to write the first data to one of the plurality of cloud service providers, the encrypting in accordance with the mapping,
wherein the plurality of pass-through connectors includes a first pass-through connector that is coupled to the proxy server and associated to a first cloud service provider and has a first encryption/decryption module, and a second pass-through connector that is coupled to the proxy server and associated to a second cloud service provider and has a second encryption/decryption module, there being in the cloud gateway one pass-through connector per cloud service provider with keys for the plurality of pass-through connectors managed by the cloud gateway,
wherein the first encryption/decryption module and the second encryption/decryption module are implemented in hardware, firmware, software executing on a processor or combination thereof; and decrypting a second data, at one of the plurality of pass-through connectors coupled to the proxy server, responsive to a request associated with one of the users or one of the network groups to read the second data from one of the plurality of cloud service providers, the decrypting in accordance with the mapping, wherein the incoming data includes padding information and encryption status, and wherein the encrypting includes encrypting an outgoing file via application of a first key in accordance with the one of the plurality of rules, encrypting the first key or a key name of the first key and file information via application of a master key, and combining the encrypted file and the encrypted first key or key name and file information as the encrypted outgoing data.

9. The computer-readable media of claim 8, wherein the method further comprises:

deriving a plurality of policy rules in accordance with the mapping, wherein the plurality of policy rules is further in accordance with active directory policies or cloud service provider access policies, and wherein the encrypting and the decrypting are in accordance with the plurality of policy rules on a basis of individual users and individual network groups.

10. The computer-readable media of claim 8, wherein the method further comprises:

obtaining one or more access tokens from one of the plurality of cloud service providers;

applying an access token when sending the encrypted first data to one of the plurality of cloud service providers; and applying an access token when requesting the second data from one of the plurality of cloud service providers.

11. The computer-readable media of claim 8, wherein the method further comprises:

applying a group key at one or more of the plurality of pass-through connectors to encrypt outgoing data belonging to one of the network groups, wherein the decrypting the second data applies the group key to control read access on an individual user basis.

12. The computer-readable media of claim 8, wherein the decrypting the second data comprises:

decrypting a first portion of incoming data, via a master key, to obtain a second key or a key name of the second key, and metadata regarding the second data; and decrypting a second portion of the incoming data via the second key, to obtain the decrypted second data.

13. A mapping and access control system in a cloud gateway, comprising:

a proxy server configured to access a plurality of cloud service providers;

a plurality of pass-through connectors coupled to the proxy server, including a first pass-through connector having a first encryption/decryption module and configured to couple to and associate to a first cloud service provider via a network, and a second pass-through connector having a second encryption/decryption module and configured to couple to and associate to a second cloud service provider via the network;

an administration module, executed by a hardware processor, configured to derive a plurality of access control rules based on users and network groups; and the plurality of pass-through connectors configured to encrypt data traveling from the proxy server to the plurality of cloud service providers and decrypt data traveling from the plurality of cloud service providers to the server, in accordance with the plurality of access control rules on a basis of individual users and individual network groups, with each pass-through connector for and associated to a specific cloud service provider, there being in the cloud gateway one pass-through connector per cloud service provider, wherein the first encryption/decryption module and the second encryption/decryption module are implemented in hardware, firmware, software executed on a processor, or combination thereof, wherein incoming data for the decrypting includes padding information and encryption status, and wherein the encrypting includes encrypting an outgoing file via application of a first key in accordance with the one of the plurality of rules, encrypting the first key or a key name of the first key and file information via application of a master key, and combining the encrypted file and the encrypted first key or key name and file information as the encrypted outgoing data.

14. The mapping and access control system of claim 13, wherein each of the plurality of pass-through connectors is specific to one of the plurality of cloud service providers.

15. The mapping and access control system of claim 13, further comprising:

a mapping software module configured to map the users and the network groups to one or more roles according to at least one of: cloud service provider access policies or active directory policies, wherein the plurality of access control rules is in accordance with the one or more roles and mapping thereto.

16. The mapping and access control system of claim 13, further comprising:

a database configured to store encryption and decryption keys for use by the plurality of pass-through connectors, with the database mapping the users and the network groups to the encryption and decryption keys.

17. The mapping and access control system of claim 13, further comprising:

each of the plurality of pass-through connectors configured to inquire to the administration module as to whether a file should be encrypted or decrypted and configured to request a key for encryption or decryption of the file in accordance with the plurality of access control rules on the basis of individual users and individual network groups.

18. The mapping and access control system of claim 13, further comprising:

the proxy server configured to obtain access tokens from the plurality of cloud service providers and to use the access tokens at an individual user level and at an individual network group level for writing data to and reading data from the plurality of cloud service providers.

19. The mapping and access control system of claim 13, further comprising:

the plurality of pass-through connectors configured to encrypt a data key into and decrypt a data key from a portion of a self-contained file, via application of a master key, wherein the data key is applied to encrypt into a portion of a first self-contained file the data traveling to the plurality of cloud service providers and is applied to decrypt from a portion of a second self-contained file the data traveling from the plurality of cloud service providers.

* * * * *

UNITED STATES PATENT AND TRADEMARK OFFICE
CERTIFICATE OF CORRECTION

PATENT NO. : 10,027,637 B2
APPLICATION NO. : 14/656518
DATED : July 17, 2018
INVENTOR(S) : Saravanan Coimbatore Page 1 of 1

It is certified that error appears in the above-identified patent and that said Letters Patent is hereby corrected as shown below:

On the Title Page

Applicant:
Please correct, "Vormetric, Inc., San Jose, CA (US)" To --THALES ESECURITY, INC., Plantation, FL (US)--

Assignee:
Please correct, "Vormetric, Inc., San Jose, CA (US)" To --THALES ESECURITY, INC., Plantation, FL (US)--

Signed and Sealed this
Seventeenth Day of September, 2019

Andrei Iancu
*Director of the United States Patent and Trademark Office*